(No Model.)
B. F. CARD.
SPEED INDICATING ALARM.
No. 573,568. Patented Dec. 22, 1896.
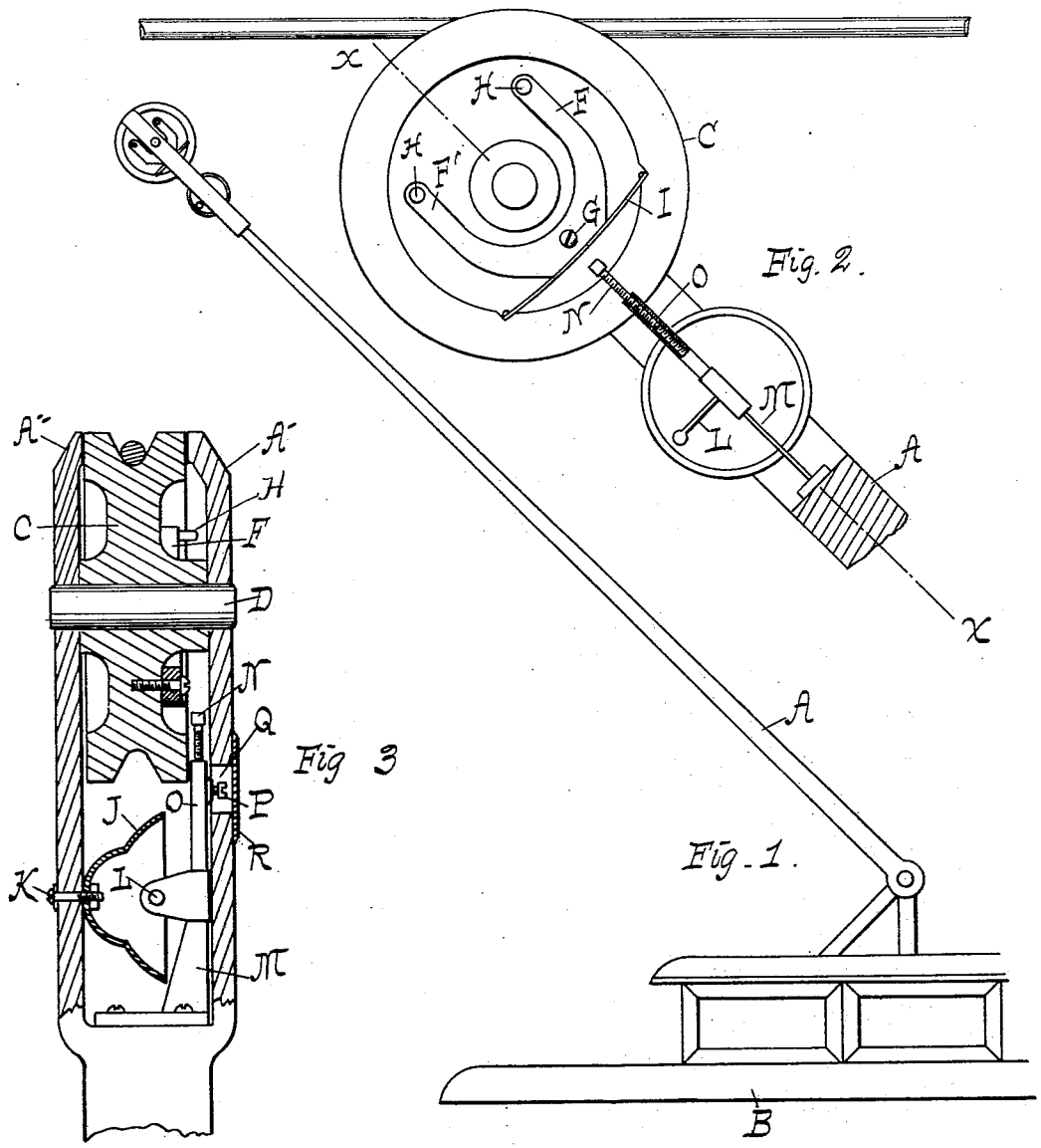
WITNESSES:
J. Landsing
Estelle M. Titus
INVENTOR
B. F. Card
BY
Edward P. Thompson
ATTORNEY.

UNITED STATES PATENT OFFICE.

BENJAMIN F. CARD, OF BROOKLYN, NEW YORK.

SPEED-INDICATING ALARM.

SPECIFICATION forming part of Letters Patent No. 573,568, dated December 22, 1896.

Application filed November 1, 1895. Serial No. 567,598. (No model.)

*To all whom it may concern:*

Be it known that I, BENJAMIN F. CARD, a citizen of the United States, and a resident of the city of Brooklyn, in the county of Kings and State of New York, have invented certain new and useful Improvements in Electric Speed-Indicators for Trolley-Cars, of which the following is a specification.

My present invention relates in general to a device for automatically indicating a predetermined maximum speed of an electric car by operating a signal when such speed is reached.

More particularly my invention relates to the particular mechanical construction of such a device and is in the nature of an improvement upon a combination set forth in the pending application.

In order to show the manner of carrying out the invention, drawings are annexed.

Figure 1 is a side elevation of a portion of an electric car provided with a trolley upon which my device is equipped. Fig. 2 is a side elevation of an enlargement of the elements of the invention. Fig. 3 is a section on line X in Fig. 2, showing that all the details may be understood by considering the three figures individually and jointly by means of reference-letters.

A represents any kind of a trolley-pole supported upon or below the car B. The trolley-wheel is C and is loose upon the arbor D, connecting the two forks A' and A", formed upon the outer end of the trolley-pole A. The tines of the fork are slightly bent inward toward the trolley-wheel, so as just to escape contact therewith and for the purpose of preventing the entrance of the conductor between the trolley and the tine A' or A".

The trolley C has an annular recess between the rim and the hub, and in this recess is swung a U-shaped lever, whose arms are F and F'. The pivot for the lever is G, and it is located eccentrically to the center of the trolley, and the arms F and F' pass to different sides of the hub and are provided with projections H, extending beyond the side of the trolley, that is, out of the recess in the trolley, and yet just so as to escape striking the tine A' when the trolley rotates. The central part of the U-shaped lever is straight and is normally in contact throughout the straight portion with the strip of steel or similar spring I which is fastened at its ends to the trolley and extends across the recess. This portion of the device is that which produces means for operating a mechanical bell, whether the wheel turns in one direction or in the other. Whether the wheel rotates to the right or to the left, one of the projections will move away from the center of the trolley more and more, according to the speed of rotation, and its motion, produced by centrifugal force, will be elastically resisted by the spring I. The bell is J and is fastened at its center to the tine A" by means of a bolt K. The knocker for the bell is L and is mounted upon a spring M, projecting from the trolley-pole A. It is evident that when this knocker moves back and forth the same strikes the bell. The knocker has a projection extending so as to escape either projection H when it rotates slowly and so that the projection H will vibrate the knocker L every time it rotates at a predetermined rate. The projection named above, extending from the knocker, consists of a screw N, adjustable in a threaded tube O, provided with a set-screw P, which is approached only through a hole Q in the tine A'. This hole Q, after the instrument has been adjusted, is covered with a seal R, which should properly have upon it the stamp of the company or some stamp against which it would be a violation of rules for any one to remove.

The operation may first be described by first setting forth the manner of adjustment. Suppose it is desired that the device should give a signal when the electric car reaches a speed of eight miles per hour. The screw N is set to a trial position—viz., about one-eighth of an inch from either of the projections H, in its nearest position thereto. Then the car may run until the bell rings. The speed of the car should be noted by some independent means. If the speed is above eight miles an hour, the screw N should be moved farther out of the tube O, first loosening the set-screw P, and by a few tests of this kind the screw N may be correctly adjusted; or a more convenient way would be to find out, first, how many revolutions the trolley C would make at a speed of eight miles per hour, and then thousands of trolley devices could be adjusted in the factory. The workman can turn the screw N by pulling it to one side from the trolley-pole and using a slender screw-driver. After adjustment and after tightening up the screw P the seal R should be applied. It would then become a disobedience of the rules of the company for the motorman to tamper with this seal in order that he might run the car faster without obtaining a signal or without being proved careless in running the car at a high speed, the principal object of the invention being that the people in the car and in the street shall know by the ringing of the bell that the car has exceeded the proper speed.

I claim as my invention—

1. The combination of a car propelled by electric energy, a pole extending therefrom, a trolley upon the pole and adapted to roll along upon an electric conductor, a centrifugal device governed by the trolley, a bell with its knocker-support, means for securing the adjustment of said support so that the bell will ring at a predetermined speed of the car, and a seal for preventing access to said means.

2. In a car, the combination of a trolley-pole, a trolley thereon, an adjustable signaling device governed by the movement of the trolley adjacent thereto, and means for sealing the adjustable device, substantially as described.

3. The combination of a car propelled by electric energy, a pole extending therefrom, a trolley upon the pole, and adapted to rolling along an electric conductor, a U-shaped lever pivoted at its center within a recess upon the side of the trolley, projections upon the ends of the lever and extending beyond the face of the trolley, and equally distant from the pivot and a spring elastically resisting the movement of the lever in both directions and a bell, whose knocker-support has an adjustable extension, which is within the limits of the path of one of the projections upon the lever when rotated at sufficient speed.

In testimony that I claim the foregoing as my invention I have signed my name, in presence of two witnesses, this 10th day of October, 1895.

BENJAMIN F. CARD. [L. S.]

Witnesses:
ESTELLE M. TITUS,
C. M. WHITNEY.